(12) United States Patent
Hedrick et al.

(10) Patent No.: US 7,525,782 B1
(45) Date of Patent: Apr. 28, 2009

(54) ADAPTIVE PROTECTION ALGORITHM AND SYSTEM

(75) Inventors: Paul Hedrick, Pittsburgh, PA (US); Helen L. Toms, Irwin, PA (US); Roger M. Miller, Mars, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 58 days.

(21) Appl. No.: 11/094,268

(22) Filed: Mar. 31, 2005

(51) Int. Cl.
*H02H 7/00* (2006.01)
(52) U.S. Cl. .................................................. 361/93.2
(58) Field of Classification Search ................. 361/93.2
See application file for complete search history.

(56) References Cited

U.S. PATENT DOCUMENTS

| | | | | |
|---|---|---|---|---|
| 4,667,152 A | * | 5/1987 | Hayes et al. | 324/76.24 |
| 5,361,184 A | * | 11/1994 | El-Sharkawi et al. | 361/93.6 |
| 5,764,044 A | * | 6/1998 | Calero | 324/76.15 |
| 6,067,483 A | * | 5/2000 | Fesmire et al. | 700/296 |
| 6,369,995 B1 | * | 4/2002 | Kagawa et al. | 361/62 |
| 6,985,784 B2 | * | 1/2006 | Vandevanter et al. | 700/95 |

* cited by examiner

*Primary Examiner*—Stephen W Jackson
(74) *Attorney, Agent, or Firm*—Annette R. Reimers; Julia C. Moody; Paul A. Gottlieb

(57) ABSTRACT

An adaptive protection algorithm and system for protecting electrical distribution systems traces the flow of power through a distribution system, assigns a value (or rank) to each circuit breaker in the system and then determines the appropriate trip set points based on the assigned rank.

5 Claims, 3 Drawing Sheets

ADAPTIVE PROTECTION ALGORITHM AND SYSTEM

This invention was made with Government support under a contract awarded by the U.S. Department of Energy. The Government has certain rights in the invention.

BACKGROUND OF THE INVENTION

The term "adaptive protection" applies to a system that continuously monitors itself for changes in configuration and power flow. As the state of the system changes, a new set of optimized protective device trip characteristics can be calculated and implemented. As a result, circuit breaker trip set points are continuously updated to best fit the changing system configuration.

Conventional adaptive protection techniques use a numerical iterative method which is complicated and time-intensive. Therefore, they are not practical and desirable.

SUMMARY OF THE INVENTION

The principal object of the present invention is to provide an adaptive protection algorithm and system for protecting electrical distribution systems that overcomes the drawbacks associated with conventional techniques and systems.

Another object of the present invention is to provide an adaptive protection algorithm and system that traces the flow of power through a distribution system, assigns a value (or rank) to each circuit breaker, and then determines the appropriate trip setpoints based on the assigned rank.

Yet another object of the present invention is to provide an adaptive protection algorithm and system that has high speed performance, can be easily implemented into a complex system, requires minimal maintenance, and has computerized efficiency with minimal memory requirements.

In summary, the adaptive protection algorithm and system for processing circuit breaker information of the present invention traces flow of power through a circuit breaker system. The algorithm assigns a value or rank to each circuit breaker based on its relative closeness to power sources and end loads. The rankings assigned to the breakers are used to determine the response time for each breaker to ensure system coordination and selectivity.

BRIEF DESCRIPTION OF THE DRAWINGS

The above objects, advantages and novel features of the present invention will become apparent from the following detailed description of the preferred embodiment(s) of the invention, illustrated in the accompanying drawings, wherein.

DETAILED DESCRIPTION OF THE INVENTION

The adaptive protection algorithm, and the system for its implementation, processes circuit breaker information to trace the flow of power through the distribution system. The algorithm then assigns a value or rank to each circuit breaker based on its relative closeness to power sources and end loads. As the electric plant configuration changes, the assigned circuit breaker rankings are updated accordingly. The rankings assigned to the breakers are used to determine the response time for each circuit breaker to ensure system coordination and selectivity.

Figure 1:
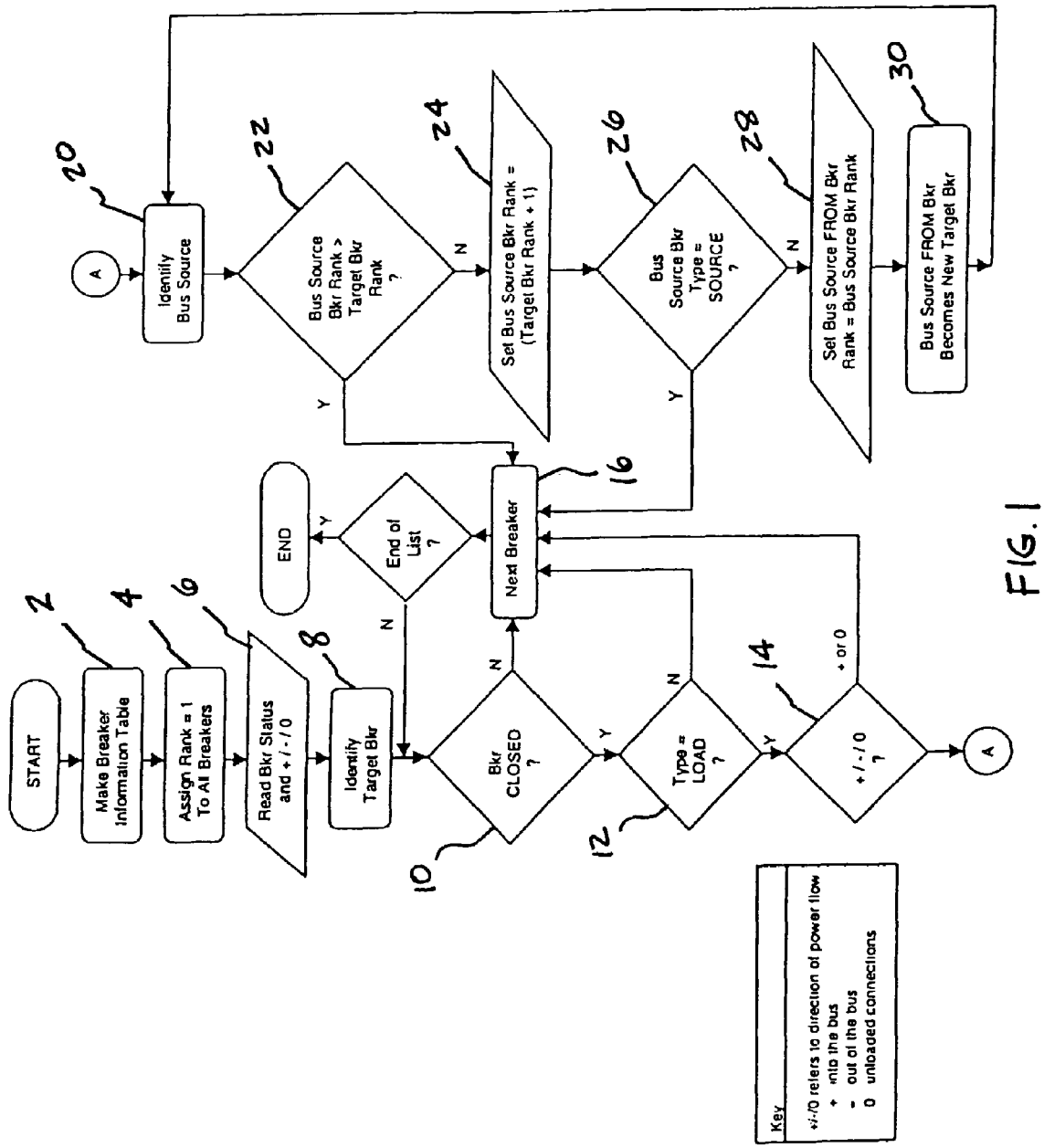
FIG. 1 is a flow chart for the overall adaptive protection coordination algorithm or scheme of the present invention.
Figure 2:
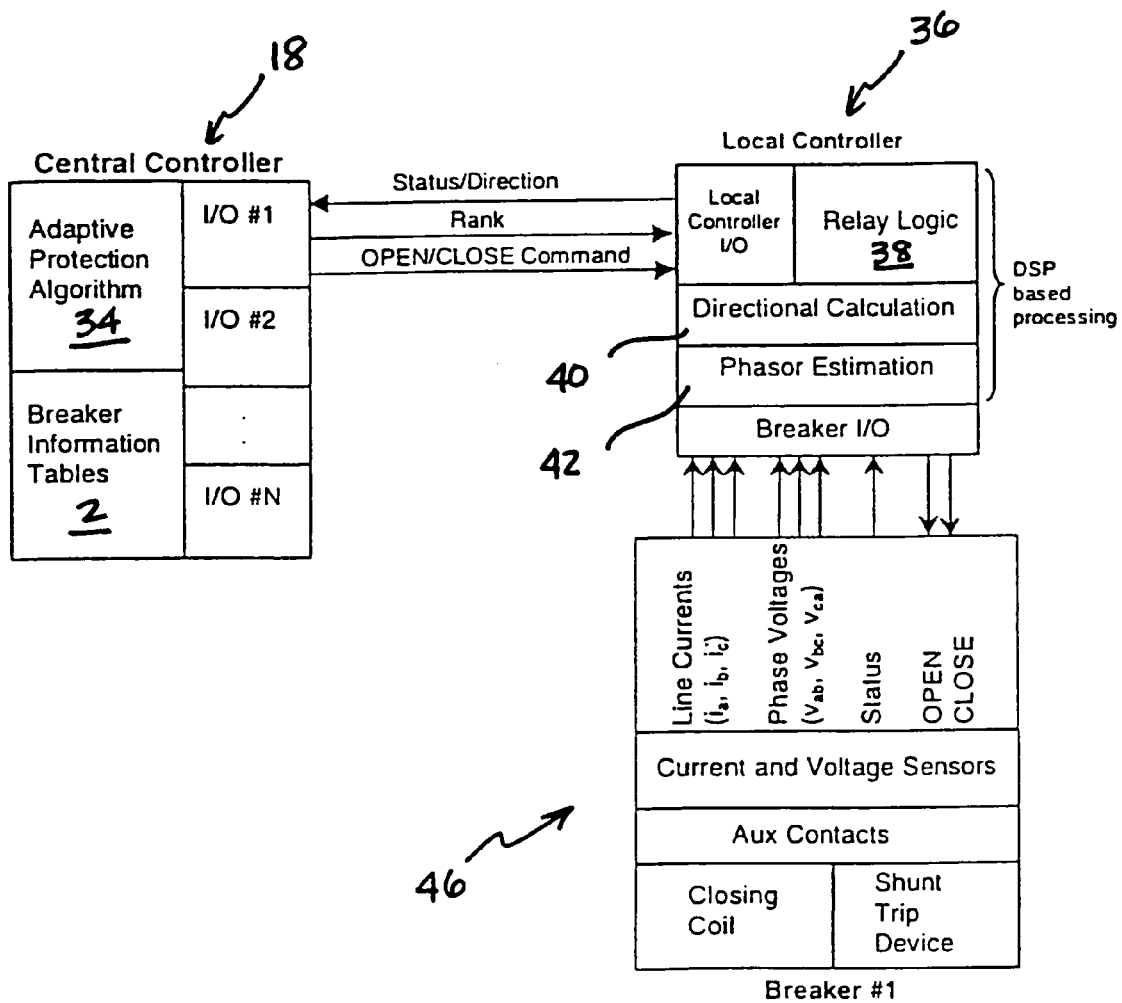
FIG. 2 is a functional diagram for the adaptive protection system implementation of the present invention.

Referring to the flow chart shown in FIG. 1, information for every breaker at every bus in the system is collected and stored in the form of information tables (step 2) in the central controller 18 (FIG. 2). These information tables contain bus location and size, breaker location, breaker identification number, service from/to identifier and breaker type classification. Initially, all breakers are assigned a rank of one (step 4).

This information is stored in memory upon initial startup and is later combined with on-line I/O from local control modules, which includes breaker status and direction of power flow (step 6). The algorithm then begins with the first breaker listed in the information table, referred to as the "Target Breaker" (step 8). If the target breaker is closed (step 10), its breaker type and power flow direction are checked. If it is identified as a load breaker and the direction of power flow is out of the bus (−) (step 14), the algorithm traces the path of power flowing toward the breaker all the way back to the original power source (subroutine A). Each breaker along the way is assigned an incrementally higher rank. Circuit breakers closest to power sources are ranked high while breakers closest to the loads are ranked low. If, noting step 10, the breaker is not closed, the next breaker in the information table becomes the new target breaker (step 16), and its status, type, and direction are checked. Further, if in step 12 the breaker is not a load type breaker (i.e., a source or intermediate distribution type breaker), the next breaker is queried at step 16. In addition, if in step 14, the direction of power flow is not out of the bus, the next breaker is queried (step 16). Each breaker is checked until the last breaker is reviewed and the process is complete. FIG. 1 also shows how (in subroutine A), once a qualified load breaker is identified, the bus supplying power to this breaker is reviewed to identify the circuit breaker that is presently supplying power to this bus. This is accomplished by polling the power flow direction data for each breaker connected to the bus. Once this bus source breaker is identified (step 20), its rank is compared to the target breaker (step 22). If the comparison shows the bus source breaker rank is greater than the target breaker rank, then these breakers are already properly coordinated and the next breaker in the information table becomes the new target breaker (at 16). Otherwise, the system continues through steps 24, 26, 28, and 30. These steps track the flow of power all the way back to the main power source, ensuring each step of the way that the breakers are properly coordinated (by incrementing the rank of each successive circuit breaker). Once this path is complete, the algorithm moves on to the next breaker listed in the information table and repeats the procedure until the ranks have been determined for all breakers in the system.

FIG. 2 shows a system to implement the algorithm 34 in an actual distribution system including the adaptive protection algorithm along with application-specific breaker and bus information tables (FIG. 1, step 2) installed at the central controller 18. At the local controller 36, DSP-based algorithms that perform the function of directional over current relays are installed including the relay tripping logic 38, directional calculation 40 and phasor estimation 42. In addition to performing a protective relay function, the local controllers provide breaker status and power flow directional information to the central controller 18 for use in the adaptive protection system and algorithm. The central controller 18 uses this information to calculate the rank of each circuit breaker and send a corresponding signal back to each of the local controllers 36. The signal will be used locally (at 46) to ensure appropriate relay performance. The flow of information between the central controller, local controller and mechanical portion of the breaker is illustrated in FIG. 2.

The adaptive protection algorithm 34, which resides in the central controller 18, was validated using several notional electrical plant architectures with multiple power sources, bi-directional power flow and multiple plant configuration changes to fully exercise the adaptive protection features of the algorithm. The validation method involved constructing the bus and breaker information tables based on selected plant line-ups. The I/O breaker status and power flow direction information was simulated by direct assignment, via software. An analysis of the system was performed using the algorithm. The output of the analysis provides the recommended rank for each breaker. The trip characteristics for each of the breakers are based on the calculated ranks. A timing study was completed to verify the performance of the algorithm in real time.

The calculated rank and the associating time current characteristic (TCC) curve determine the response time of a breaker. There are many types of TCC curves. The International Electrotechnical Commission (IEC) Very Inverse Model was selected in this invention and is directly implemented at all breakers assigned a rank of one. For ranks of two and higher, a preselected time delay was added to the Very Inverse Model insuring a breaker assigned a high rank will respond with a longer time delay, allowing proper coordination with downstream breakers. The association of rank and trip set points is implemented in the relay tripping logic algorithm.

The relay tripping logic 38, directional calculations 40 and phasor estimation algorithms 42, which reside in the local controller 18, were validated through a bench top hardware demonstration. The implementation and operation of a relay requires algorithms for modeling the relay characteristics, calculating the direction of power flow, and estimating line currents and voltages. The algorithms were tested to prove the real time performance of the phasor estimation software and relay logic routines. Software editor/debugging tools, an SBC54 DSP board and power supply were installed with a lap top computer in a hardware demonstration setup. A signal generator was used to simulate typical current sensor outputs. The developed system successfully converted sampled waveform data to an accurate amplitude value (as displayed on a panel meter) using the phasor estimation algorithm, calculated the appropriate time delays, and generated trip signals which were sent to the bench top representation of the breaker shunt trip device (FIG. 2).

Figure 3:
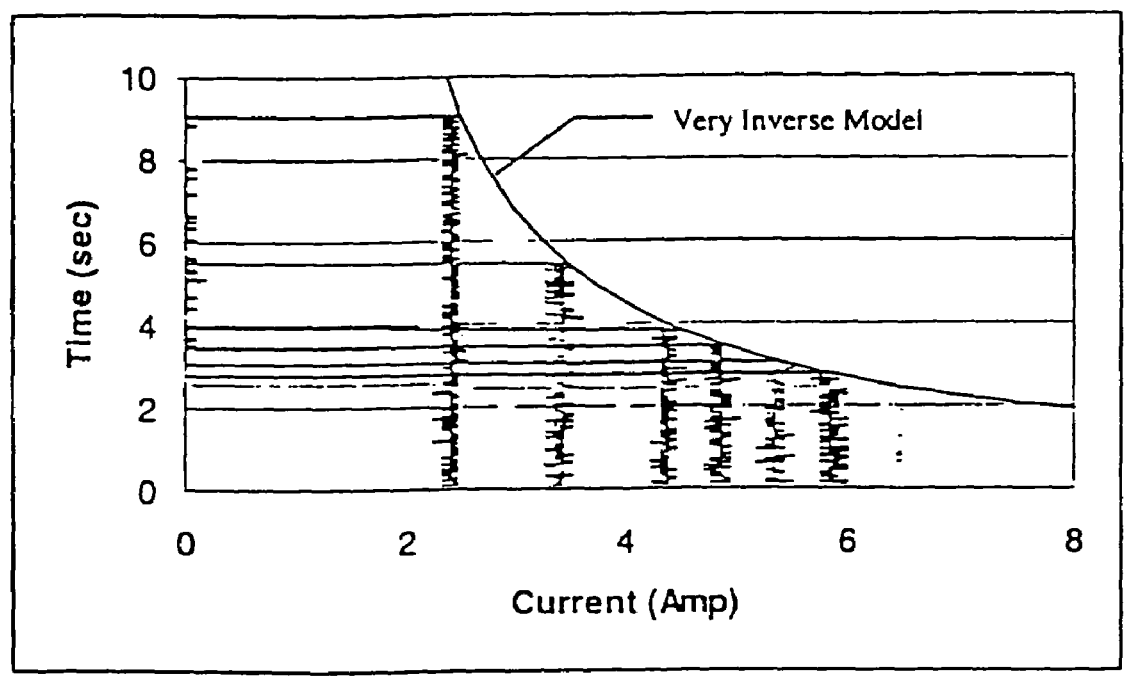
FIG. 3 illustrates test plots obtained by executing the algorithm.

The results recorded by the test equipment were generally compared against Very Inverse Model, i.e., the model used for a breaker assigned a rank of one. The test plots illustrate a close match between the system-generated time delays at different current levels and the IEC Very Inverse Model (FIG. 3).

Thus, we have disclosed a new method and system for protecting electrical distribution systems using an adaptive protection technique, which continually traces the flow of power through a distribution system, and optimizes the protection system performance by updating circuit breaker trip characteristics to meet the needs of changing plant conditions. The method was verified using both software simulation and hardware demonstration. Advantages of this invention include high-speed performance, easy implementation into a complex distribution system, minimal maintenance and computational efficiency with minimal memory requirements.

While this invention has been described as having preferred sequences, ranges, steps, materials, structures, features, and/or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the appended claims.

What is claimed is:

1. A power distribution system adaptive protection algorithm that continuously monitors itself for changes so that as the state of the power distribution system changes, a new set of protective device trip characteristics can be calculated and implemented, the power distribution system including power sources and loads and having a plurality of circuit breakers, and further including at least one bus and a circuit breaker for said bus, the adaptive protection algorithm comprising:
   (a) a distribution system power flow tracer;
   (b) a circuit breaker rank assigner that assigns rank to each of the circuit breakers based upon closeness of the power sources and end loads;
   (c) a response time assigner that determines response time for each of the circuit breakers in the distribution system based upon the assigned rank;
   (d) a memory that stores information identifying each circuit breaker in the distribution system; and
   (e) at least one information table to store information that is collected, said information further comprising one or more of bus location and size, circuit breaker location, circuit breaker identification number, service from/to identifier, and circuit breaker type classification, such that circuit breaker trip set points are continuously updated.

2. An adaptive protection algorithm that continuously monitors itself for changes so that as the state of the power distribution system changes, a new set of protective device trip characteristics can be calculated and implemented, in combination with a power distribution system including power sources and end loads, the power distribution system including a plurality of circuit breakers, and further including at least one bus and a circuit breaker for said bus, the adaptive protection algorithm comprising:
   (a) tracing power flow through the power distribution system;
   (b) assigning a rank to each of the circuit breakers in the power distribution system based upon its closeness relative to the power sources and the end loads;
   (c) assigning a response time for each of the circuit breakers in the distribution system based on the rankings assigned to the breakers;
   (d) a memory that stores information identifying each circuit breaker in the distribution system; and
   (e) at least one information table to store information that is collected, said information further comprising one or more of bus location and size, circuit breaker location, circuit breaker identification number, service from/to identifier, and circuit breaker type classification, such that circuit breaker trip set points are continuously updated.

3. An adaptive protection process for processing circuit breaker information that continuously monitors itself for changes so that as the state of the power distribution system changes, a new set of protective device trip characteristics can be calculated and implemented by tracing the flow of power through a distribution system, the system including at least one power source and at least one load, the process comprising the steps of:

(a) providing a plurality of circuit breakers in the system;

(b) assigning a value or rank to a first of the circuit breakers in the system, the value or rank being based on the relative closeness of the circuit breaker to the at least one power source and the at least one load;

(c) assigning values or ranks to the other circuit breakers in the system relative to the first circuit breaker;

(d) storing information in a memory for each circuit breaker, the information including one or more of bus location and size, circuit breaker identification number, circuit breaker location in the distribution system, service from/to identifier, and circuit breaker type classification; and (e) wherein the information being stored upon initial startup is combined with on-line I/O from local control modules, wherein the I/O includes breaker status and direction of power flow, such that circuit breaker trip set points are continuously updated.

4. The process of claim 3, further comprising the steps of assigning a rank of one to a first of the circuit breakers in the system and assigning values or ranks to each of the other breakers along the system from the at least one power source to the at least one load.

5. An adaptive protection system that continuously monitors itself for changes so that as the state of the power distribution system changes, a new set of protective device trip characteristics can be calculated and implemented, comprising:

(a) a central controller including a plurality of I/O connections for use with a plurality of circuit breakers;

(b) said central controller including an adaptive protection algorithm and circuit breaker information tables;

(c) at least one local controller connected to said central controller using an I/O connection;

(d) said local controller comprising a DSP based processing element including a mechanism that directs overcurrent relays, performs relay tripping logic, calculates power flow direction, and performs phasor estimation, and a circuit breaker I/O connection;

(e) said local controller including a circuit breaker status detector and a power flow direction determiner, and (f) at least one circuit breaker connected to said circuit breaker I/O connection, such that circuit breaker trip set points are continuously updated.

* * * * *